Dec. 17, 1963   H. T. LIBBY   3,114,829
ARC WELDING METHOD AND APPARATUS
Filed Nov. 10, 1961   2 Sheets-Sheet 1
Fig 1
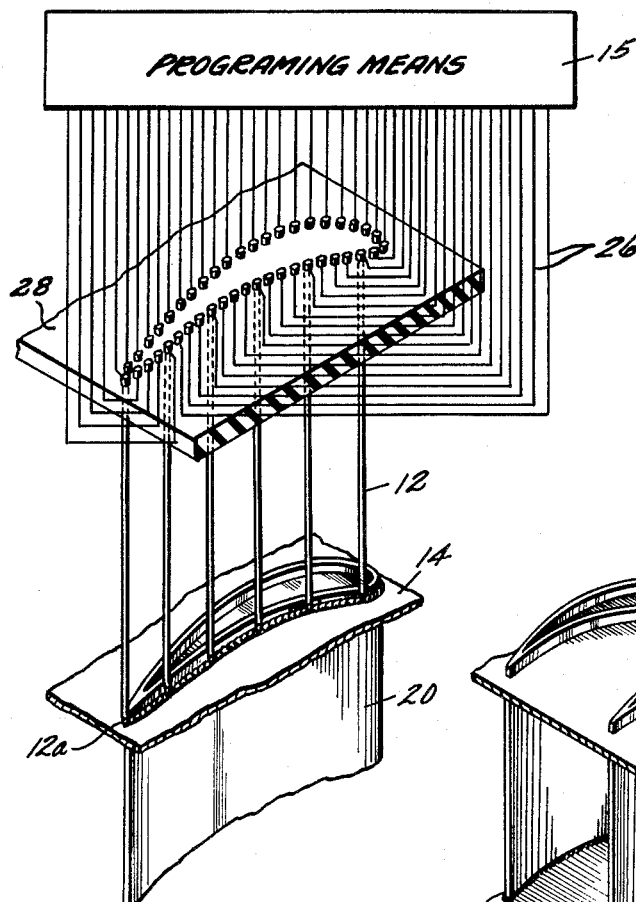
Fig 2
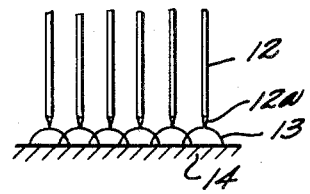
Fig 3
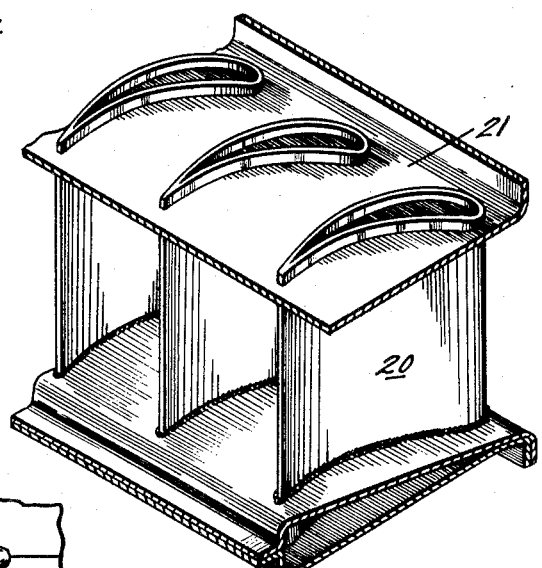
Fig 4
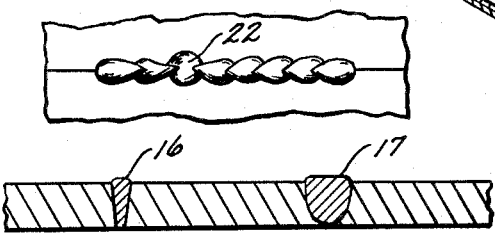
Fig 5
INVENTOR.
HENRY T. LIBBY
BY Lee H. Sachs
ATTORNEY.

Dec. 17, 1963   H. T. LIBBY   3,114,829
ARC WELDING METHOD AND APPARATUS
Filed Nov. 10, 1961   2 Sheets-Sheet 2
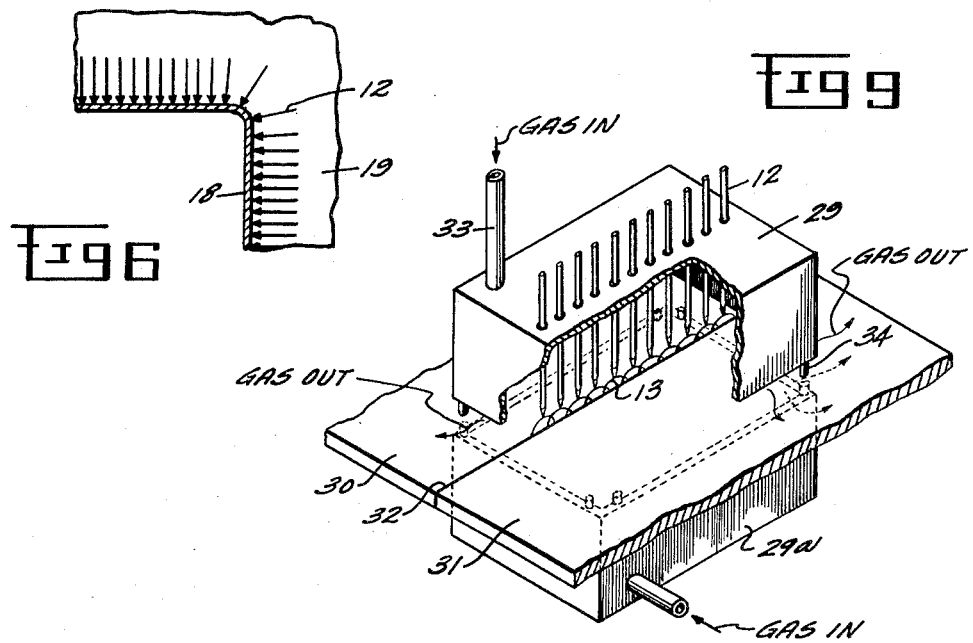
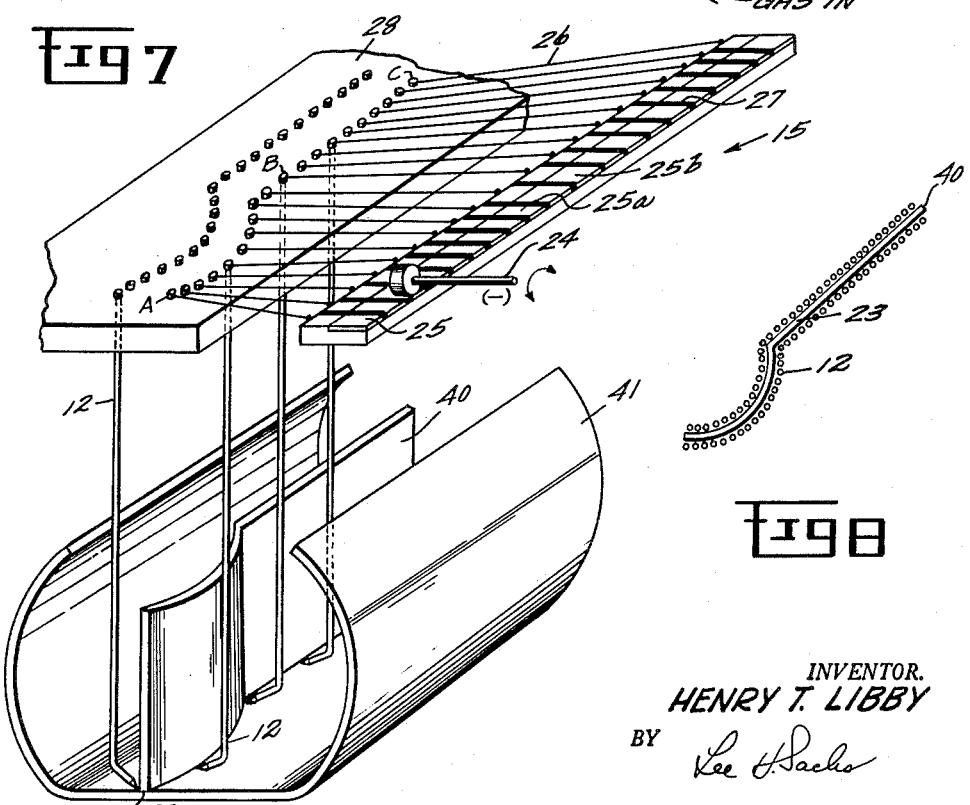
INVENTOR.
HENRY T. LIBBY
BY
ATTORNEY

United States Patent Office 3,114,829
Patented Dec. 17, 1963

3,114,829
ARC WELDING METHOD AND APPARATUS
Henry Thomas Libby, Reading, Mass., assignor to General Electric Company, a corporation of New York
Filed Nov. 10, 1961, Ser. No. 151,530
9 Claims. (Cl. 219—124)

This invention, which generally relates to arc welding, is particularly concerned with arc welding using programed multiple electrodes of the nonconsumable type to produce an improved, continuous fusion weld.

In one form of the well known arc welding method, sometimes called fusion welding, a continuous arc from a nonconsumable electrode is held over the juncture between two metal pieces to be joined for a time and over an area sufficient to melt the material to be joined and sufficient to fuse the joint. To weld a seam, the continuously arcing single electrode is moved along a juncture. In some instances, separate materials, sometimes referred to as filler metals, are placed over the juncture area before or during arcing. The time required to melt the parent metal or the filler metal and the parent metal depends on the type and thickness of the material. Although each configuration and material requires a certain time with a given electrical energy arc to perform the arc welding, the methods and apparatus known prior to the present invention did not limit or control the conduction of heat away from the weld area into that portion of the material sometimes referred to as the "heat affected zone."

During continuous arcing in the nonconsumable electrode arc welding methods known prior to the invention, it is inevitable that portions of the parent metal adjacent the joint being welded become heated in a manner which can effect its shape and properties. This is particularly significant in precision articles. For example, excessive local heating of gas turbine vanes during welding to a support can result in distortion and excessive metal grain growth as well as undesirable stresses in the material which can lead to premature failure. This adjacent portion or heat effected zone is greater in arc welds accomplished by progressively welding the joint from a single heat source, a process sometimes referred to as the traveling or progressive arc, than it is in small area "tack" welding accomplished by striking an individual or non-traveling arc for the time required to melt the material being joined.

In other forms of welding, such as consumable electrode welding in which the electrode material is deposited at the juncture, the heat effected zone of the material being joined is relatively broad.

In addition to the well known method of propelling a single arcing electrode along a juncture, it has been known to arrange in a spaced apart battery a plurality of consumable and nonconsumable electrodes for arc welding. Such prior arrangements as in United States Patents 2,511,426, Bienfait et al., 2,654,015, Landis et al. and 2,798,937, Miller have been programed to operate simultaneously or in a traveling sequence, though in spaced apart relationship. No means has been provided, prior to the present invention, for co-ordinating the arcing of a series of spaced apart electrode to produce a continuous fusion weld with an unusually narrow heat effected zone. The heat generated by the arcing of a single moving electrode or a battery of simultaneously operating spaced apart electrodes can have an accumulative effect. Heat is not dissipated rapidly enough to confine the heat zone closely to the weld junction. The greater the heat effected zone the greater is the distortion and the stresses due to severe local heating.

It is a principal object of this invention to provide an improved welding apparatus for producing a fusion weld of narrow heat effected zone from a plurality of arc welds.

It is another object of this invention to provide an arc welding method to produce a continuous fusion weld from a plurality of arc welds to combine the advantages of joining through the use of individual arcs with the advantage in strength of producing a continuous arc weld along a juncture between portions to be joined.

Still another object is to provide a method and apparatus which can perform three dimensional welding at an increased rate such that time is a factor as the fourth dimension.

These and other objects and advantages will become more apparent from the following detailed description and appended claims taken in connection with the accompanying drawing in which:

FIG. 1 is a partially diagrammatic, isometric view of an article welded according to the present invention;

FIG. 2 is a fragmentary diagrammatic view of the overlapping relationship of the arc cones from the adjacent electrodes of FIG. 1;

FIG. 3 is an isometric partially fragmentary view of the article of FIG. 1 in assembly;

FIG. 4 is a diagrammatic plan view of a weld made according to the present invention;

FIG. 5 is a cross-sectional view comparing weld nuggets;

FIG. 6 is a partially diagrammatic view of an electrode arrangement to weld a corner junction;

FIG. 7 is a partially diagrammatic view of one form of the apparatus of this invention in operation;

FIG. 8 is a plan view of the electrode arrangement for the juncture in FIG. 7; and FIG. 9 is a partially fragmentary diagrammatic view of another form of an electrode arrangement.

The apparatus of this invention in one form comprises a plurality of nonconsumable electrodes positioned in spaced relationship in a line which follows the shape of a juncture between materials to be welded, the electrodes being spaced one from the other such that the arc cone area of one electrode on a workpiece overlaps the arc cone area of its next adjacent electrode. The apparatus in another form includes programing means to schedule the arcing of successive electrodes in continuous sequence and to control the flow of energy to each electrode according to variations in shape of juncture, as well as the type of material and thickness of the work piece.

One example of a significance use of the present invention is in the manufacture of modern complex power plant equipment such as the turbine nozzle shown in FIG. 3. The joining of materials, particularly of the super alloy type, is becoming increasingly difficult. Two of the ways to join the hollow vane 20 to band 21 in FIG. 3 are brazing and arc welding. In many cases welding is more desirable to avoid the close fit-up between parts as is necessary in brazing. However, because the metal of the parts to be joined is relatively thin and the part is of accurate configuration and strength characteristics, ordinary continuous arc welding, and even moderate temperature brazing, can introduce excessive stress and distortion into the part as well as to allow metal grain growth. Hence the properties of the metal and the part are reduced due to the severe local heating in ordinary arc welding.

Referring to FIGS. 1 and 2 in which only some of the electrodes are shown in full, each electrode 12 includes a tip portion 12a at which arcing occurs with the workpiece, the tip portion of each individual, separate electrode being in particularly spaced relationship one with the other and, during welding operation of each electrode, at arcing distance from the juncture being welded. This arcing distance is shown by arc cone 13, it being understood that adjacent electrodes are not each in full arcing operation at the same time as illustrated in FIGS. 2 and 9. However, one electrode may be subjected to decaying current while its adjacent electrode is being subjected to increasing current in order to shift the arc from one electrode to the other while maintaining an ionized condition around the weld. Nevertheless, regarding spacing, the arc cone area on the workpiece of each electrode overlaps that of its next adjacent electrode.

Through the practice of this invention there is obtained the narrow more desirable weld shown at 16 in FIG. 5 rather than the more massive weld nugget, shown at 17 in FIG. 5, which larger nugget of necessity results in a broader heat effected zone.

For purposes of this description, the term "series" or the term "consecutive series sequence" in regard to discussion of welding arcs is meant to mean a series of arcs passing in consecutive sequence one from the other in full welding operation, it being understood that adjacent electrodes can be activated for purposes of decaying or increasing current as mentioned above. Similarly, the term "disconnected" is meant to refer to a series of arcs disconnected in regard to being at full welding operations at the same time. The term "arc cone area" refers to the extent of the plane of intersection between an arc from an electrode to the workpiece and the surface of the workpiece struck by the arc.

Spacing between the tip portion 12a and a workpiece 14 under each arcing condition is a function of the thickness and type of material being joined as well as the size of the weld desired. The apparatus of this invention includes electrical energy source means in electrical connection with each electrode individually to supply welding current and to provide an electrical potential to the electrodes different from that of the material to be welded. The apparatus in one form includes programming means 15 of FIG. 1 such as of the mechanical, electrical, electronic, tape control, etc. type operably connected with both the electrical energy source means and the electrodes to program by scheduling and controlling the flow and timing of electrical energy to each electrode as a function of the juncture to be welded, the material to be welded and the position of the electrodes with relation to each other and to the workpiece.

The programming means schedules or times the flow of electrical energy to each of the plurality of electrodes so that (1) each electrode is in full arc welding relationship with the workpiece separately from its adjacent electrodes during the welding operation conducted beneath that particular electrode although all current flow to adjacent electrodes may not be terminated completely, and (2) the time of full arcing of successive electrodes allows metal flow between successive weld pools.

The method and apparatus of this invention provides a fusion weld of narrow heat effected zone through the use of a plurality of programed nonconsumable electrodes which produce during welding adjacent weld pools which are connected and flow together, as shown in FIG. 4, to form a continuous fusion weld of high quality. The invention co-ordinates the arcing time of particularly spaced adjacent electrodes with the cooling rates of the weld pools so that adjacent weld pools flow together. Thus the time an electrode is restrained from arcing should be no greater than that which allows the pool of a next previously arc electrode to cool down to the minimum temperature at which the second next adjacent arc weld pool will join or flow together with the first pool. This relationship is true no matter what the configuration being welded happens to be. For example, as shown in FIG. 6, if it is desired to weld around the corner at the juncture of an L shaped metal partition 18 with a backing plate 19, the lower mass or the greater preheating occurring from weld to weld in that configuration would require the programming means to schedule more non-arcing or "off" time at the junctures at which such sharp directional changes in junctures occur. Through practice of the present invention, there can be factored into an automatic welding operation the recognition that more preheating will occur between a series of consecutive welds at corners or sharp curves than on straight portions being welded. Supplementing the programming means for providing shorter time or lower current flow at the corners, as shown in FIG. 7, can be radial alignment of the electrodes to provide greater spacing at a corner as shown in FIG. 6.

Regarding components of the programming means used in the apparatus and the method of this invention, any switching on-off means for the current can be used. For example, one relatively simple means is to use standard relays for switching the current off and on. However such relays are somewhat limited as to speed. Other examples of switching means include rectifier tubes, thyratron or ignitron tubes, as well as numerous electrical and electronic devices well known in the art.

As was indicated briefly above, during one form of operation, the current flow in an electrode being arced for welding need not be completely terminated before its next adjacent electrode can be activated. The current in the first-to-fire electrode can be decayed as the current is increased in the next adjacent electrode. In this way, the welding arc is maintained and transferred more readily from one electrode to the other because of the maintenance of a continually ionized atmosphere, although the individual welds are still considered to be made from disconnected arcs. Programming of the total current required is adjusted to maintain the above described consecutive flow of weld pools without excessive and needless heat being generated.

Equipment embodying the present invention has been activated by standard punched tape and control units in which the tape was punched to program through the control and switching means for any on-off time desired.

The speed at which a juncture can be welded according to this invention is limited only by the on-off time required, as is dictated by the configuration material being welded, as well as to what extent or degree of accuracy and speed the programming means including switching and the like can translate that desired on-off time into current changes. Therefore according to this invention, with the exception of equipment limitations, the limit of welding speed is dictated by the characteristics of the material and shape of the juncture. The programming means can be any device which will perform this function.

The programming means having functions described above can provide for an initial, "tack" welding at unconnected points along a juncture by programing non-adjacent arc welds from selected electrodes such as those indicated by A, B, and C in FIG. 7, for example to hold members 40 and 41 in the proper relative position. Then on final welding of the members, the programing means takes into consideration the previous welds at these points such as by a slower increase in current over a longer time to remelt the weld at each point in order to result in the same improved overall weld shown in FIG. 4. The only deviation from the tear drop shape flow pattern of a weld made according to this invention is the initial weld indicated at 22 in FIG. 4.

The method and apparatus of the present invention can be used to obtain strong fusion arc welds at unusually shaped and difficult to reach junctures. This can be accomplished as in FIG. 7 by bending a plurality of particularly spaced apart electrodes 12 which can, for example, be held in a fixture 28, so that they are located at and conformed to the shape of a juncture 23. Thus virtually any shape can be joined. All that is required is that there be some type of access port through which a plurality of electrodes can enter, the ends of the electrodes during welding operation being located at proper arcing distance from the juncture to be welded. Thus it is conceived through the practice of this invention that a plurality of electrodes insulated one from the other and held in a tube or rod bundle could be used to weld structures, such as tubes, in well-like recesses. A typical arrangement of electrodes required for the welding of juncture 23 between members 40 and 41 is shown in FIG. 8. For simplicity and ease of viewing, FIG. 7 shows only some of electrodes 12 in full view. The timing component of programming means 15 is represented in FIG. 7 as a movable electric contact 24 rolling over stationary electrical contacts 25. It is to be noted that, in accordance with the previous discussion regarding greater preheating at sharp changes in juncture direction, contact 25a in this arrangement is narrower than 25b to limit the passage of welding current through conducting means 26, such as wires, to a shorter period of time because of its corner location. Electrical contacts are insulated one from the other by an insulating means such as 27, with the electrode being held and insulated one from the other by holder 28.

Through the practice of the present invention, simple, inexpensive tooling can be made to conduct arc welding in a desired atmosphere. For example, electrode holder 29 in FIG. 9 has been formed in the shape of an enclosure over the plates 30 and 31 to be welded at juncture 32 so that an atmosphere such as an inert gas can be introduced through an opening such as tube 33. Thus the gas can be maintained within the enclosure of holder 29 under a pressure sufficient to maintain a desired atmosphere within the enclosure. The arrangement of FIG. 9 provides for flow out around the edges of the holder adjacent the article being welded. Such an arrangement can be made mobile by substituting rollers for supports 34 to pass over a juncture being welded or can be adapted to allow the juncture being welded to pass beneath the electrodes such as by means of an indexing mechanism. Furthermore, a similar enclosure such as 29a can be used to provide an atmosphere to the reverse side of the juncture being welded. Although it is preferable to use an inert or reducing gas atmosphere on both sides of readily oxidizable materials, gas on the reverse side is not necessary in all cases and, in fact, cannot always be employed because of the inaccessibility of the junctures in welding some articles. However the gas atmosphere helps to ionize the arc as well as to inhibit the workpiece material from oxidizing. It is preferable to provide the enclosure with a low rate of flow, under low pressure, rather than a high rate of flow, such as would result from a nozzle directed at the arc. A high rate of gas flow can disturb the arc to a great extent and can serve to siphon air into the weld zone causing excessive oxidation of the workpiece. All that is required in the fixture such as is shown in FIG. 9 is to replace the air and maintain a slight pressure.

Referring to the article of FIG. 3 welded as shown schematically in FIG. 1, in one example the electrode 12 was a material consisting of 1% by weight thorium with the balance tungsten and had a diameter of 0.040 inch. The material of the vane 20 and band 21 being joined had the composition, by weight, of 15.5% Cr, 2.5% Ti, 1% Al, 7% Fe, 1% Co with the balance essentially nickel. The electrodes were spaced at a gap of about 0.045 inch from the workpiece and about 0.090 inch one from the other. The members being joined had a thickness of about 0.032 inch, although this same gap relationship was used successfully for material from 0.02–0.06 inch in thickness. The current required was 65 amps. direct current with straight polarity. The enclosure shown schematically in FIG. 9 was used employing argon gas on both the reverse side and on the front side of the juncture. The rate of welding was about 10 inches per minute, the over all time for the welding of one juncture shown in FIG. 3 was about 28 seconds including 5 "tack-welds" as previously described.

In other examples iron and cobalt base alloys such as those consisting of, by weight, of 1.5% Mn, 0.7% Si, 15% Cr, 25% Ni, 1.25% Mo, 2.0% Ti, 0.3% V with the balance iron and 20% Cr, 10% Ni, 1.5% Mn, 15% W with the balance cobalt have been joined in various thicknesses of material using electrodes comprising 1% Th with the balance tungsten and 2% Th with the balance tungsten as preferable electrode materials.

The above mentioned "tack" welding as a preliminary step can be achieved through the programming means of the present invention. The electrodes can be arced out of sequence as an initial operation to provide the tack weld. Then when the consecutive series sequence is programmed, the same electrode or group of electrodes can be arced repeatedly with progressively decaying current in order to eliminate cracking of a portion of the welded juncture which at this point may have a cast-like structure.

Thus it has been found that judiciously programming as to duration and sequence of activation a plurality of arc welding electrodes, particularly located in relation to each other to provide overlapping arc welds, as well as programming according to the shape of the juncture between and thickness of the members to be joined, a greatly improved arc welded joint can be obtained.

Although this invention has been described in connection with specific examples, it will be readily understood by those skilled in the welding and metallurgical arts and in equipment design, the variations and modifications of which the present invention is capable.

What is claimed is:

1. In arc welding apparatus having welding electrodes and means to supply welding current to the electrodes:
   a plurality of nonconsumable electrodes in spaced relationship and electrically insulated one from the other,
   the electrodes being positioned along a line having the shape of a juncture to be welded,
   the electrodes being spaced one from the other such that during operation with a workpiece the arc cone area of one electrode overlaps the arc cone area of its next adjacent electrode; and
   programming means including means to schedule the application of welding current to successive electrodes in consecutive series sequence.

2. In arc welding apparatus having welding electrodes and means to supply welding current to the electrodes:
   a plurality of nonconsumable electrodes in spaced relationship and electrically insulated one from the other,
   the electrodes being positioned along a line having the shape of a juncture to be welded,
   the electrodes being spaced one from the other such that during operation with a workpiece the arc cone area of one electrode overlaps the arc cone area of its next adjacent electrode, and
   programming means including
      (1) means to schedule the application of welding current to successive electrodes in consecutive series sequence, and
      (2) means to control the flow of energy to each electrode according to the shape of the juncture, the type and condition of material of a workpiece and the thickness of the workpiece.

3. In arc welding apparatus having welding electrodes and means to supply welding current to the electrodes:
   a plurality of nonconsumable electrodes in spaced relationship and electrically insulated one from the other,
   the electrodes being positioned along a line having the shape of a juncture to be welded,
   the electrodes being spaced one from the other such that during operation with a workpiece the arc cone area of one electrode overlaps the arc cone area of its next adjacent electrode;
   programming means including
      (1) means to schedule first in a nonconsecutive series sequence the application of welding current to some but not all of the electrodes to initially tack together members to be joined and then to schedule in consecutive series sequence the application of welding current to successive electrodes, and (2) means to control the flow of energy to each electrode according to the shape of the juncture, the type and condition of material of the workpiece and the thickness of the workpiece.

4. Arc welding apparatus comprising:

a plurality of nonconsumable electrodes in spaced relationship and electrically insulated one from the other, the electrodes being positioned along a line having the shape of a juncture to be welded;

means to apply welding current individually to the electrodes;

the electrodes being spaced one from the other such that during operation with a workpiece the arc cone area of one electrode overlaps the arc cone area of its next adjacent electrode; and programing means including means to schedule the application of welding current to successive electrodes in consecutive series sequence.

5. Arc welding apparatus comprising:

a plurality of nonconsumable electrodes in spaced relationship and electrically insulated one from the other, the electrodes being positioned along a line having the shape of a juncture to be welded;

means to apply welding current individually to the electrodes;

the electrodes being spaced one from the other such that during operation with a workpiece the arc cone area of one electrode overlaps the arc cone area of its next adjacent electrode;

programing means including (1) means to schedule first in a nonconsecutive series sequence the application of welding current to some but not all electrodes to initially tack together members to be joined and then to schedule in consecutive series sequence the application of welding current to successive electrodes, and (2) means to control the flow of energy to each electrode according to the shape of the juncture, the type and condition of material of the workpiece and the thickness of the workpiece.

6. Arc welding apparatus comprising:

an energy source to supply welding current;

a plurality of nonconsumable electrodes in spaced relationship and electrically insulated one from the other;

the electrodes being positioned along a line having the shape of a juncture to be welded;

means to apply welding current individually to the electrodes;

the electrodes being spaced one from the other such that during operation with a workpiece the arc cone area of one electrode overlaps the arc cone area of its next adjacent electrode; and programing means including means to schedule the welding arcs of successive electrodes in consecutive series sequence.

7. In a method of arc welding, the step of:

energizing into welding arcs in consecutive series sequence each of a plurality of disconnected individual nonconsumable welding electrodes so that a second of any two consecutive individual welding arcs produces a second weld pool which overlaps the first weld pool of a first of the consecutive series, the second weld pool being produced before the first weld pool has solidified to a point sufficient to prevent the flow of the second weld pool into the first weld pool, whereby a continuous fusion weld is produced from a series of discontinuous individual arc welds.

8. A method of arc welding comprising the steps of:

locating a plurality of nonconsumable electrodes along and at arc welding distance from a juncture of a workpiece to be welded so that the arc cone areas of adjacent electrodes overlap, the electrodes being electrically insulated one from the other;

energizing into welding arcs in consecutive series sequence each of a plurality of disconnected individual nonconsumable welding electrodes so that a second of any two consecutive individual welding arcs produces a second weld pool which overlaps the first weld pool of a first of the consecutive series, the second weld pool being produced before the first weld pool has solidified to a point sufficient to prevent the flow of the second weld pool into the first weld pool, whereby a continuous fusion weld is produced from a series of discontinuous individual arc welds.

9. A method of arc welding comprising the steps of:

locating a plurality of nonconsumable electrodes along and at arc welding distance from a juncture of a workpiece to be welded so that the arc cone areas of adjacent electrodes overlap, the electrodes being electrically insulated one from the other;

initially tacking together members of the juncture by energizing into welding arcs in nonconsecutive series sequence some but not all of the electrodes; and then arc welding the juncture into a continuous fusion weld by energizing into welding arcs in consecutive series sequence each of the plurality of disconnected individual nonconsumable welding electrodes so that a second of any two consecutive individual welding arcs produces a second weld pool which overlaps the first weld pool of a first of the consecutive series, the second weld pool being produced before the first weld pool has solidified to a point sufficient to prevent the flow of the second weld pool into the first weld pool, whereby a continuous fusion weld is produced from a series of discontinuous individual arc welds.

References Cited in the file of this patent

UNITED STATES PATENTS

| | | |
|---|---|---|
| 483,428 | Coffin | Sept. 27, 1892 |
| 2,511,426 | Bienfait et al. | June 13, 1950 |
| 2,527,336 | Schaefer | Oct. 24, 1950 |
| 2,654,015 | Landis et al. | Sept. 29, 1953 |
| 2,798,937 | Miller | July 9, 1957 |
| 2,868,954 | Skinner et al. | Jan. 13, 1959 |
| 2,868,956 | Lobosco | Jan. 13, 1959 |